United States Patent
Protopapas

(10) Patent No.: US 9,275,208 B2
(45) Date of Patent: Mar. 1, 2016

(54) SYSTEM FOR VEHICULAR BIOMETRIC ACCESS AND PERSONALIZATION

(71) Applicant: FORD GLOBAL TECHNOLOGIES, LLC, Dearborn, MI (US)

(72) Inventor: Maria Eugenia Protopapas, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 113 days.

(21) Appl. No.: 13/845,389

(22) Filed: Mar. 18, 2013

(65) Prior Publication Data

US 2014/0282931 A1     Sep. 18, 2014

(51) Int. Cl.
G06F 21/00 (2013.01)
G06F 21/31 (2013.01)
G06F 21/32 (2013.01)

(52) U.S. Cl.
CPC ............... *G06F 21/31* (2013.01); *G06F 21/32* (2013.01); *G06F 2221/2111* (2013.01)

(58) Field of Classification Search
CPC ..... H04N 21/4415; G06F 21/32; G06F 21/31; G06F 2221/2111; G06K 9/00006; B60R 25/00; G07B 17/00733
See application file for complete search history.

(56) References Cited

U.S. PATENT DOCUMENTS

| | | | |
|---|---|---|---|
| 6,373,380 B1* | 4/2002 | Robertson et al. | 340/425.5 |
| 6,675,082 B2* | 1/2004 | Galli et al. | 701/49 |
| 6,714,894 B1* | 3/2004 | Tobey et al. | 702/188 |
| 8,463,488 B1* | 6/2013 | Hart | 701/32.3 |
| 8,806,613 B2* | 8/2014 | Zafiroglu | H04L 63/0823 726/17 |
| 8,977,408 B1* | 3/2015 | Cazanas et al. | 701/2 |
| 2002/0077829 A1* | 6/2002 | Brennan et al. | 704/275 |
| 2003/0060966 A1* | 3/2003 | MacPhail et al. | 701/117 |
| 2003/0204290 A1* | 10/2003 | Sadler et al. | 701/1 |
| 2004/0059633 A1* | 3/2004 | Rankin | G06Q 50/12 705/15 |
| 2005/0237150 A1 | 10/2005 | Sun et al. | |
| 2006/0175396 A1* | 8/2006 | Call | G06Q 10/00 235/380 |
| 2007/0136128 A1* | 6/2007 | Janacek | G07B 15/02 705/13 |
| 2007/0156528 A1* | 7/2007 | Hopp et al. | 705/14 |
| 2007/0158128 A1* | 7/2007 | Gratz et al. | 180/287 |
| 2008/0061988 A1* | 3/2008 | Mock et al. | 340/573.1 |
| 2008/0174485 A1* | 7/2008 | Carani | G06Q 10/08 342/357.46 |
| 2009/0309697 A1* | 12/2009 | Miller | B60R 25/24 340/5.25 |
| 2010/0071041 A1* | 3/2010 | Ikegami | 726/6 |
| 2010/0087987 A1 | 4/2010 | Huang et al. | |
| 2010/0097178 A1* | 4/2010 | Pisz et al. | 340/5.72 |
| 2010/0222939 A1* | 9/2010 | Namburu et al. | 701/2 |
| 2010/0242102 A1* | 9/2010 | Cross et al. | 726/7 |
| 2010/0255953 A1* | 10/2010 | McCullough et al. | 477/94 |

(Continued)

OTHER PUBLICATIONS (IEEE Snapshot).*

(Continued)

*Primary Examiner* — Michael Pyzocha
(74) *Attorney, Agent, or Firm* — Frank MacKenzie; Brooks Kushman P.C.

(57) ABSTRACT

A system and method for authenticating a user and creating and applying a user profile may include authenticating an administrator via an administrator identification. A user identification distinct from the administrator identification may be received, as well as a set of selected features associated with the user. A profile may be created and may include the user identification and the set of selected features. The profile may be applied in response to authenticating a user based on the user identification.

20 Claims, 11 Drawing Sheets

(56) References Cited

U.S. PATENT DOCUMENTS

| | | | | |
|---|---|---|---|---|
| 2010/0268768 | A1* | 10/2010 | Kurtenbach | H04L 67/1097 709/203 |
| 2011/0137520 | A1* | 6/2011 | Rector et al. | 701/36 |
| 2011/0215899 | A1* | 9/2011 | Van Wiemeersch | B60R 25/04 340/5.24 |
| 2011/0215900 | A1* | 9/2011 | Corradino et al. | 340/5.53 |
| 2011/0304465 | A1* | 12/2011 | Boult et al. | 340/576 |
| 2012/0011358 | A1* | 1/2012 | Masone | 713/153 |
| 2012/0079581 | A1* | 3/2012 | Patterson | 726/7 |
| 2013/0219294 | A1* | 8/2013 | Goldman-Shenhar et al. | 715/751 |
| 2013/0232029 | A1* | 9/2013 | Rovik | G06Q 30/016 705/26.8 |
| 2013/0263282 | A1* | 10/2013 | Yamada et al. | 726/28 |
| 2014/0005859 | A1* | 1/2014 | Baskin et al. | 701/2 |
| 2014/0200737 | A1* | 7/2014 | Lortz et al. | 701/1 |
| 2015/0088337 | A1* | 3/2015 | Toohy | B60R 16/037 701/1 |

OTHER PUBLICATIONS

Biometric Driver Authentication Based on 3D Face Recognition for Telematics Applications; School of Computer Engineering, Sejong University; College of Health Sciences, Korea University, Seoul, Korea; <<http://dl.acm.orq/citation.cfm?id=1766366&dl=ACM&coll=portal>>; On pp. 473-480; Publication date: 2007.

Multi-biometric Fusion for Driver Authentication on the Example of Speech and Face; Otto-von-Guericke University of Magdeburg; Brandenburg University of Applied Science; <<http://omen.cs.uni-maqdeburg.de/automotiv/cms/upload/BIO09.pdf>>; On pp. 220-227; Publication date: 2009.

Driver Recognition Based on Dynamic Handgrip Pattern on Steeling Wheel; Inst. for Technol. Res. & Innovation, Deakin Univ., Geelong, VIC, Austrailia; <<http://ieeexplore.ieee.org/xpl/freeabs_all.jsp?arnumber=6063552>>; On pp. 107-112; Publication date: Jul. 6-8, 2011.

* cited by examiner

| User | Category | Prim. Ident. | Sec. Ident. | Admin. | Features ||||||
|---|---|---|---|---|---|---|---|---|---|---|
| | | | | | Lane Assist | Collision | Blind Spot | Parking | Restraints | Speed |
| User 1 | Primary | key fob | biometric | x | | x | x | | x | |
| User 2 | Primary | key fob | | x | | x | x | | x | |
| User 3 | Temporary | PIN | | | x | x | x | x | x | 70 mph |
| User 4 | Secondary | Smart Device | biometric | | x | x | x | x | x | 70 mph |

FIG. 2

SYSTEM FOR VEHICULAR BIOMETRIC ACCESS AND PERSONALIZATION

BACKGROUND

Car manufacturers continue to investigate ways to improve the security of a vehicle while allowing for personalized settings to be saved and recalled based on the identity of a user. Certain key transmitters may identify specific users. Each identified user may be associated with a set of pre-defined settings or preferences. However, there is a need for a more user-friendly system to establish and manage users and their respective settings. There is also a need for a system to efficiently authenticate users based on user input.

SUMMARY

A management system for authenticating a user and customizing a user profile may include a control module configured to authenticate an administrator via an administrator identification. The control module may receive a user identification distinct from the administrator identification, receive a set of selected features associated with the user and create a profile including the user identification and the set of selected features. Once the profile is created, the control module may apply the profile associated with the user identification in response to authenticating a user based on the user identification.

A method may include authenticating an administrator via an administrator identification. The method may also include receiving a user identification distinct from the administrator identification, receiving a set of selected features associated with the user, and creating a profile including the user identification and the set of selected features. The profile may be applied in response to authenticating a user based on the user identification.

A non-transitory computer-readable medium tangibly embodying computer-executable instructions may include authenticating an administrator via an administrator identification. The method may also include receiving a user identification distinct from the administrator identification, receiving a set of selected features associated with the user, and creating a profile including the user identification and the set of selected features. The profile may be applied in response to authenticating a user based on the user identification.

BRIEF DESCRIPTION

FIG. 2 illustrates an exemplary chart of exemplary user profiles to be stored in the database of the management system;

DETAILED DESCRIPTION

Described herein is a management system for establishing and managing personalized settings within a vehicle based on a user identification. The system may facilitate easy management of user profiles which identify a specific user by a unique user identification method. The profiles also establish a set of selected features to be enabled during the user's use of the vehicle (e.g., speed limitations, restraint alerts, etc.). While a user may initially be authenticated based on the presence of a key fob or other transmitter, the user may be further authenticated based on the user identification. The profile associated with the identification may be transmitted in response to the authentication. Because the user is further identified by the user identification, the specific key fob or transmitter used to access a vehicle may not necessarily be associated with a specific user or category of user. Thus, the user identification instead of the transmitter may be used to implement the selected features. Moreover, a user interface may be provided to facilitate a user-friendly system for creating and modifying user profiles within the system. The user interface may be located within a vehicle, or remotely therefrom.

Figure 1:
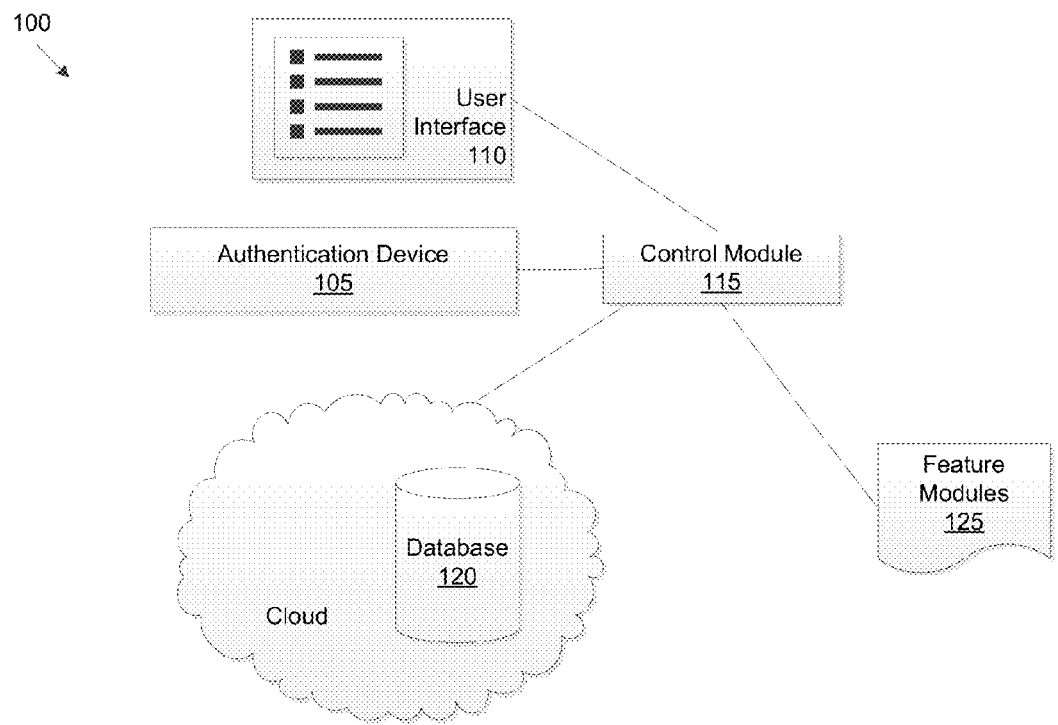
FIG. 1 illustrates an exemplary management system.

FIG. 1 is an exemplary management system 100 having an authentication device 105, user interface 110, control module 115, and database 120. The authentication device 105 may be in communication with the control module 115 of a vehicle and include any device capable of acquiring unique user identifications to identify a user. For example, the authentication device 105 may be a biometric device such as a biometric fingerprint scanner. The biometric device may also be a voice recorder configured to receive and transmit an audio recording, such as a pre-established phrase that could be used to identify a user. The authentication device 105 may also be capable of recognizing facial features for facial recognition authentication. The authentication device 105 may also be a key pad capable of receiving input from the user such as a personal identification number (PIN). In this example, the key pad may be integrated into the door of a vehicle in which the keypad may also be used to gain access to the vehicle. The keypad may also be included and presented to the user via the user interface 110 within the vehicle such as within the dash board or user console. In one example, the user interface 110 may include the MyFord Touch®. The keypad may also be included in the smart device, which may also receive input from the user and communicate a PIN to the control module 115. The authentication device 105 may also be an ignition switch or an ignition key. The authentication device 105 may also be a transceiver configured to receive input, or signals, from a transmitter, such as a key fob.

Additionally or alternatively, the transceiver may be capable of communicating with a smart device such as a mobile Wi-Fi enabled device to further identify a user. The smart device may be configured to communicate with the control module 115 using one or more mechanisms such as Ethernet, Bluetooth®, Wi-Fi®, WiFi protocols (802.11b, 802.11g, 802.11n, etc.), or any other wired or wireless communications mechanism. In the example of a smart device, the transceiver may receive information from the smart device via a communication protocol recognized by the transceiver within the vehicle. The information may include information unique to the device so as to identify the smart device. While a vehicle is turned on, the transceiver and control module 115 may be configured to receive communications from the smart device. However, when the vehicle is off, the transceiver may also be off, so as to not drain any reserve battery power of the vehicle. In this example, the transceiver and/or control module 115, may periodically awake to detect communications from the smart device. This method of authentication may be used to identify a user based on the signal received from the smart device. This identification may be used to apply a respective user profile. The identification may also be used to grant access to the vehicle (e.g., exterior access upon approaching the vehicle.) Additionally or alternatively, the authentication device 105 may be a smart device capable of receiving inputs such as PINs, biometric data, voice samples, facial recognition, finger prints, etc. Thus, authentication may take place outside of the vehicle once the user enters within a pre-defined radius of the vehicle. The user location may be determined by using GPS technologies within the smart device. Additionally or alternatively the vehicles sensors may determine that the smart device is within a sensor's operation range.

In one example, the smart device may be used to authenticate a user as the user is approaching the vehicle. Once the smart device is detected within a predetermined radius of the vehicle, the smart device may be used to authenticate the user by any of the mechanisms described herein, (e.g., a unique smart device identifier, biometric inputs, PIN, etc.) Thus, the smart device may include a biometric device, keypad, etc., to facilitate authentication.

The authentication device 105 may also be a combination of devices. More than one device may be necessary to collect user input data to authenticate a user. In one example, a user may be required to be dually authenticated via both a key fob transmitter as well as a PIN. In another example, the user may only need to be authenticated based on a single input. However, in an instance where one input will not authenticate the user, either because it is of poor quality, or the respective device is faulty, the user may input a second form of identification for authentication purposes. For example, if a user is attempting to input biometric data, such as a fingerprint, but the biometric scanner cannot acquire an adequate sample, perhaps due to dirt or oil on the scanner, the user may alternatively be authenticated via a PIN.

The authentication device 105 may be in communication with the control module 115 within the vehicle. The control module 115 may be located within the vehicle. Additionally or alternatively, the control module 115 may be located remotely from the vehicle and in communication with a vehicle processor via a cloud or network communication mechanism. The control module 115 may be configured to receive input from the authentication device 105. The control module 115 may include various device drivers, as necessary, for each type of authentication device 105. In one example, where the authentication device 105 includes a biometric fingerprint sensor, the control module 115 may include a device driver configured to receive the biometric input from the sensor. The biometric input from the sensor may be configured to translate a fingerprint scan into a vector representation (e.g., biometric template). The device driver within the control module 115 may be configured to perform such translation. The authentication device 105 itself may also be configured to perform the necessary translations. Additionally or alternatively, a separate processor (not shown) may also be configured to receive the user input from the authentication device 105. The processor may then transmit the input to the control module 115. The processor may also communicate directly with the database 120.

The user interface 110 may be a graphical user interface (GUI) and may be configured to display and facilitate the operation of the management system 100. Exemplary screen shots to be displayed via the user interface 110 are presented in FIGS. 3A-3F. The user interface 110 may be used to facilitate the processes described in FIGS. 4-8. More specifically, it may be used as an authentication device 105, as described above.

The control module 115 may include, or be in communication with, a plurality of other feature modules 125. These additional modules 125 may be associated with specific features within the vehicle. These features may include warnings, or aids designed to increase the safety of the vehicle under the user's operation. In one example, a lane assist module may be in communication with the control module 115. The lane assist module may alert a driver when he or she is drifting out of the current lane. The collision alert module may alert the user to a slow moving or stopped vehicle in front of it. The blind spot alert module may alert the driver when an object is within the driver's blind spot. The parking assistant module may help a driver parallel park. A restraint warning module may alert a driver and/or passenger when the vehicle occupants' seat belts are not fastened. The speed limitation module may limit the top end speed of the vehicle. Additional modules may also be included, such as modules affecting user settings such a seat position module, climate control module, cruise control module, remote start module, welcome screen or HUD module, etc.

Each of these modules may be configured to communicate with at least a portion of the vehicle elements responsible or associated with that module. In the example of the speed limitation module, the module may be in contact with the vehicle's electronic speed control (ESC) to limit the top end speed a car may achieve based on a predefined speed setting.

The control module 115 and/or the processor may also communicate with a database 120 configured to store user identifications and vehicle settings associated therewith in a user profile. Via the management system 100, the user profiles within the database 120 may continually be modified and updated. This process is described herein. An exemplary visual representation of a database 120 of user profiles is shown in FIG. 2. In FIG. 2, the user profiles for specific registered users may each have at least one identification associated with the registered user. Moreover, each user may have a set of feature settings. These feature settings include at least one feature, as described above with respect to the associated modules. The features may be selected or deselected, or include a specific value associated therewith. Taking, for example, user 1, a blind spot alert module may be selected and enabled, but a max speed limitation may not be set. However, user 4, which may be a teenager or new driver, may have a max speed set at 70 miles per hour. As described herein, specifically with respect to the processes in FIGS. 4-7, the users and the features associated therewith may be modified and updated.

In addition to the features and identifications, a specific user profile may also include a classification such as primary or secondary. Each classification may be associated with a predefined set of enabled features. For example, a primary classification may indicate that the user is one of the main operators of the vehicle while a secondary classification may indicate that a user only periodically operates the vehicle. In one example, a vehicle may be predominantly driven by a parent, or primary member. However, on the weekends and evenings a teenage child, or secondary member, may occasionally drive the vehicle. In some circumstances, but not necessarily, a primary member may also be an administrator member. An administrator may typically be the owner of a vehicle. In one example, an administrator may be one of two adults in a household. In another example, an administrator may be a manager within an organization in charge of a service vehicle or fleet of vehicles. For example, a moving company may have several drivers for each of their moving vehicles. An administrator may be cognizant or aware of the status, location and driver of each vehicle. Moreover, an administrator may have more authority as to how members are added, deleted and modified. For example, an administrator may have the ability to create another administrator, modify existing non-administrator members, etc.

Returning to FIG. 1, the database 120 may be stored in a cloud storage system. The cloud storage system may allow access to the database 120 regardless of the location of the user. The database 120 may be reached by the control module 115 within the vehicle. The database 120 may also be remotely accessed at a user's personal computer, tablet, smart device, etc. The system 100 may determine whether the database 120 is up to date. In one example, it may be determined whether the most recent user profiles are included in the database 120. Upon recognizing that a vehicle has been started, the system may query the database 120 for updated user profiles. These updated user profiles may be received from the vehicle, or other systems, such as web-based systems, in order to further define, or re-define a user profile. If a new profile is detected, (e.g., the time stamp on one profile is more recent than the time of an existing profile,) then the new profile may be stored within the database 120 and applied going forward.

Limits on the total amount of access attempts may also be applied. For example, if a user attempts several biometric inputs and fails, and then in turn attempts multiple PIN inputs and fails, the system may time-out for a predetermined amount of time in an effort to increase vehicle security (e.g., preventing theft). In some situations a PIN may be guessed by trial and error. Thus, implementing an overall limit may prevent unauthorized access.

Moreover, upon receiving authentication requests, the system 100 may have a predefined number of allowable access attempts. For example, a user may only attempt to access the vehicle a maximum number of times via the same authentication method before the user may become 'locked out'. A notification may be presented, indicating that the authentication has failed, via the user interface 110, as well as via an audible chime or message through the user interface 110 or vehicle speakers. Additionally or alternatively notification may come from the smart device via an SMS message. A vehicle's interior or exterior lights may also indicate that a user has been authenticated by varying their hues or blinking on in off in a certain pattern.

Additionally or alternatively, the user may be prompted via the user interface 110 to user a different authentication mechanism. For example, if the user has repeatedly tried to be authenticated via a biometric input such as a finger print, without success, after the fifth try, the user interface may prompt the user with a message such as "Maximum authentication attempts reached, please use alternative authentication method." The user may then attempt authentication via another method, such as using a key fob, or entering a PIN. Upon reaching the maximum amount of access attempts, the database 120 may flag a record associated with the user. This flag may indicate to the system to verify that the database has not become corrupt.

If a user record has been flagged, the system may proceed to determine whether or not the database is correct. Any number of integrity methods may be used to verify the authenticity of the database. For example, checksums may be compared, e.g., comparing a user's cloud profile with a vehicle profile. If the checksums are not the same, then the process may proceed to override the vehicle copy of the profile with the cloud copy of the profile. If the checksums are the same, the process may determine whether a previous version of the user's profile exists. This may be done by checking the time stamps of the user profiles within the database 120. If there is no other version of the profile, a default profile for the specific user types associated with the user at authentication (e.g., primary or secondary) is applied. If a new version of the profile is present, the new profile may overwrite the existing user profile and be applied.

Figure 3A:
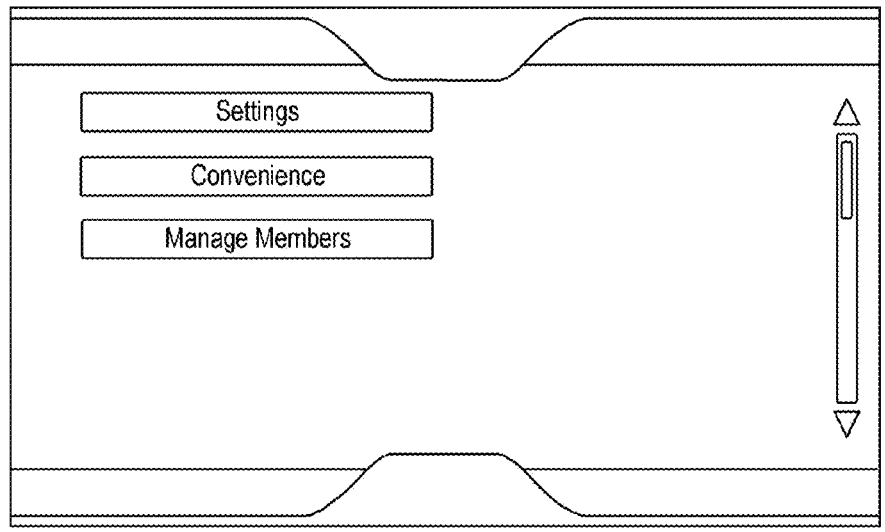
FIGS. 3A-3F illustrate exemplary screen shots from the user interface of the exemplary management system.
Figure 3B:
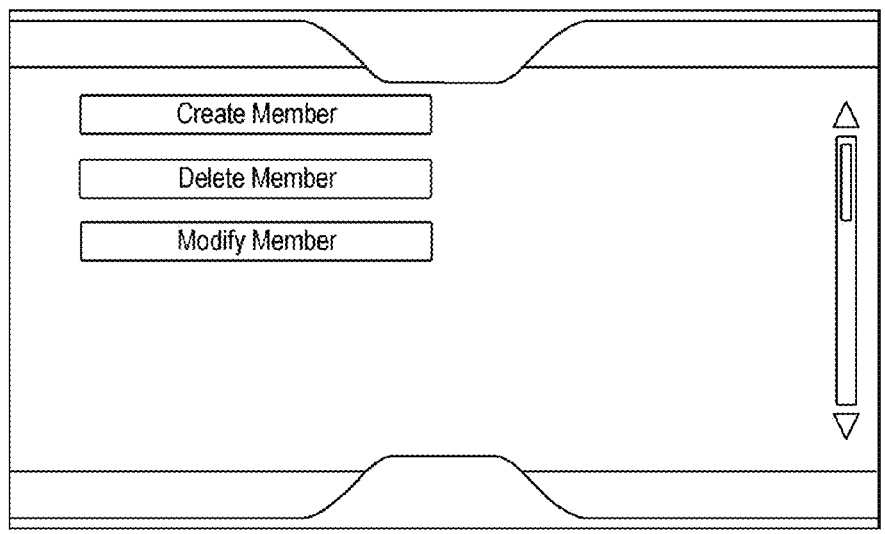

FIGS. 3A-3F show exemplary user interfaces configured to facilitate the modification, creation and deletion of registered users and their respective feature settings. These screens are only exemplary and intended to facilitate the understanding of the below described process and are in no ways limiting. These exemplary interfaces may be referred to below in describing such processes. FIG. 3A is an exemplary interface within a vehicle. The user interface may present a plurality of options for managing specific systems within a vehicle. For example, the management system 100 may be configured to facilitate the management of users and their respective feature settings and may be presented via the 'Manage Members' option. By selecting the 'Manage Members' option, the management system 100 may be launched. FIG. 3B is an exemplary interface displayed in response to the management system 100 being launched.

Figure 3C:
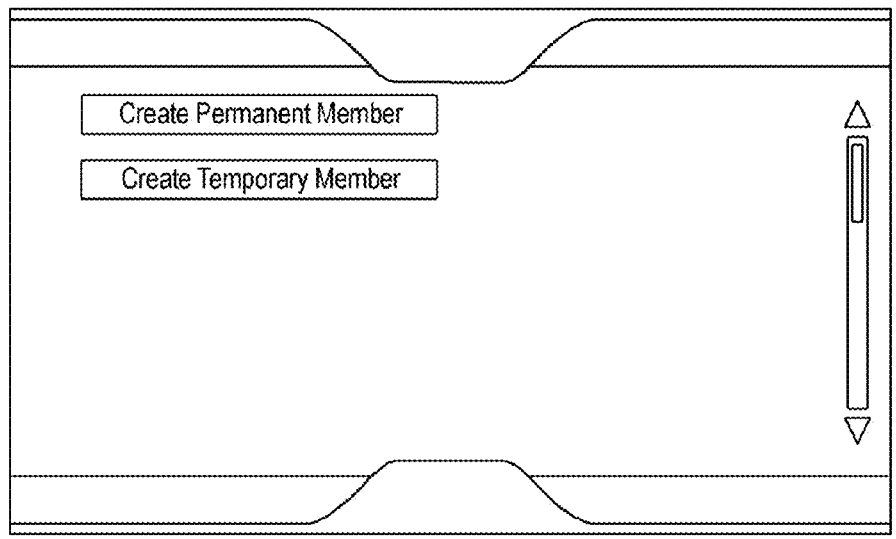

FIG. 3B sets forth options for managing and registering user profiles. As exemplified, create member, delete member and modify member options are displayed. A create member option may be presented to create a new registered member within the system 100. As shown in FIG. 3C, the member may be a 'Permanent Member,' such as a family member or employee that is expected to drive the vehicle regularly. The member may also be a temporary member, such as a valet, car repair personnel, etc. Each of the permanent member option and temporary member option may create user profiles having specific default features. These default features may include a predefined selection of certain features. For example, a temporary member option may include an expiration feature within the user profile which would set the user's registration to expire after a predefined amount of time. For example, if a registered user is valet parking, the registered user may select to create a temporary member to give the valet personnel temporary access to the vehicle. The valet personnel may be given a PIN or be authenticated by other methods. However, this authentication may only be valid for a predetermined amount of time, such as a 3 hour window. The default profile for a temporary member may include this time limit, as well as other feature selections. Moreover, as described herein, the default profile may be overridden and modified within the management system 100. Additionally or alternatively, a user classification, such as primary or secondary, may also be selected, although not explicitly shown in the exemplary figures. As explained, each of these categories also may have default settings associated therewith.

Figure 3D:
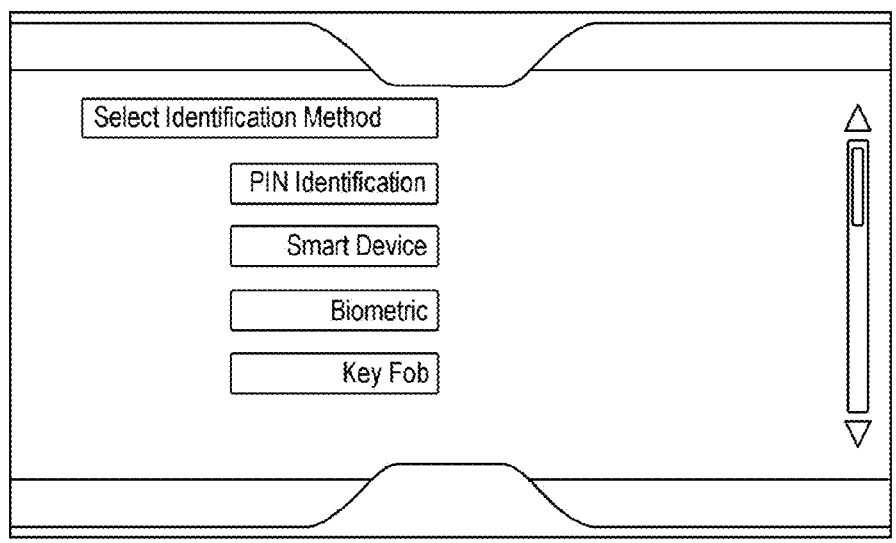

FIG. 3D sets forth an exemplary interface for selecting an identification method in response to selecting to create a new member. The identification method selected may be used to identify the new user. For example, the new user may be identified using a PIN input. The PIN input may give the user access to vehicle features, including allowing the user to drive the vehicle with certain features and constraints enabled. The identification method may correspond to the available authentication devices 105 within the system 100. For example, a PIN identification may be available as long as an appropriate key pad module is in communication with the control unit. The PIN may also be inputted using the vehicle's user interface. The PIN may be generated by the primary user, administrator, dealer, etc., to initiate creating a user profile within the vehicle when key fobs are not available. This ensures that only someone with the owner knowledge, either given explicitly, via the PIN, or implicitly, via possession of a valid key fob, can create a profile.

Moreover, a biometric input may be available to identify the new user as long as a biometric device is included in the system 100. The identification method may include, but is not limited to, PIN, smart device, biometric, key fob, etc. The identification method may be a secondary form of authentication following a primary authentication. A primary authentication, as described herein, may include accessing the vehicle via a general input such as a key fob or transmitter. This primary authentication may not be user specific. Thus, the secondary authentication provides for a more user specific authentication. Moreover, the user profile may be associated with the user identification and not the general input.

Figure 3E:
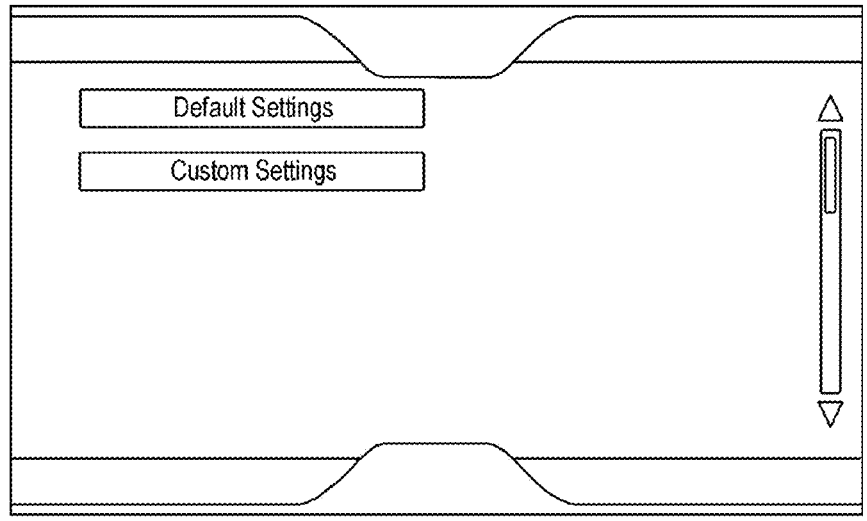

FIG. 3E sets forth an exemplary interface for selecting between custom settings and default settings when creating a user profile. Default settings may allow the user to accept the default settings stored within the database 120 and apply them to the new user profile. This may create a short cut for creating a new user thus saving time. Moreover, selecting the default settings may ensure that all of the appropriate features are selected and avoid the possibility of missing, or not selecting, an important feature (e.g., the restraint warning). Although not shown, by selecting the default settings option, a user may be presented to select a category, such as primary or secondary, associated with the new member. Each category may have its own default settings, differing from the other. For example, a primary member may have only a select few features selected while a secondary member may have nearly all of the features enabled. A secondary member may be new drivers, such as teenagers. Secondary members may also be guests, valets, etc. Primary members may have the ability to customize their profiles. However, secondary members may have limited customization abilities. By selecting either a primary or secondary member, the user is able to quickly identify the type of driver and apply the respective default settings for the new user profile.

Figure 3F:
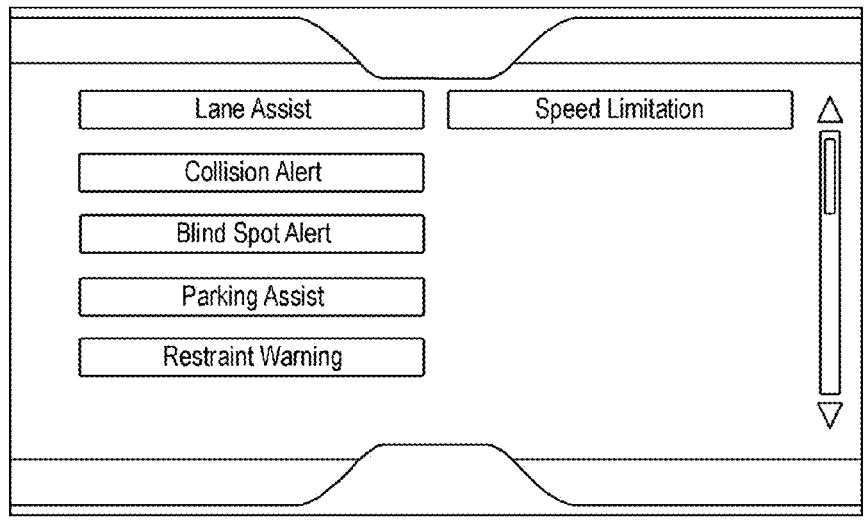

Selecting a custom setting may allow the user profile to be created on a feature by feature basis. Selection of the custom setting option may prompt an interface allowing for the selection and customization of certain features. An exemplary interface is shown in FIG. 3F. Although not necessarily exhaustive, the interface in FIG. 3F displays a plurality of features that may be selected to be included in a user profile. Some features, such as the speed limitation feature, may also be customized, meaning a specific value may be placed established and saved within the profile.

Figure 4:
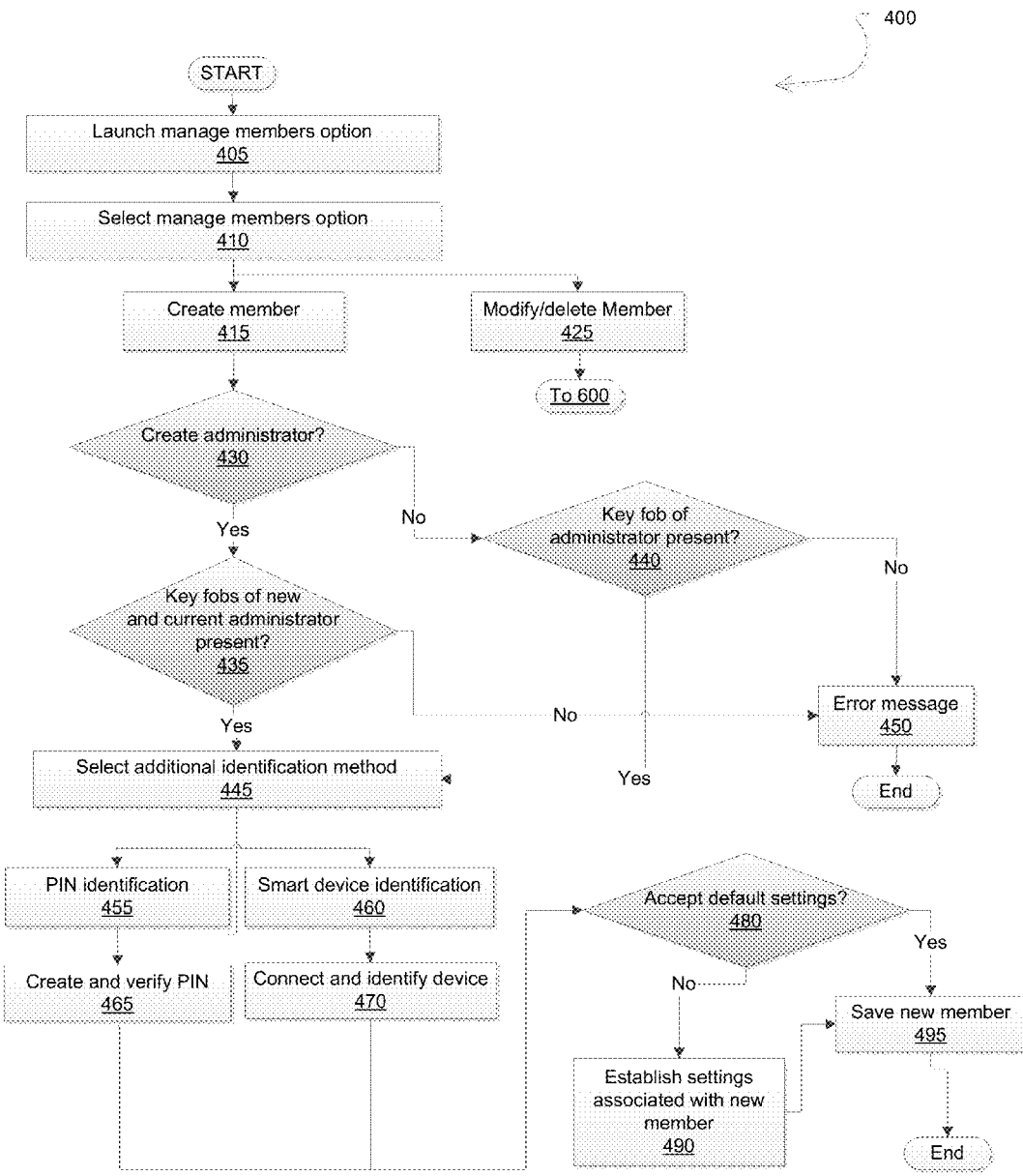
FIG. 4 illustrates an exemplary flowchart of an exemplary process for creating user profiles.

FIGS. 4-7 show exemplary processes for customizing personalization settings via the management system 100. FIG. 4 shows an exemplary process 400 for creating, customizing and modifying user profiles using user key fobs as an initial identification method. At block 405 a user may launch the manage members option via the user interface 110. An exemplary interface 110 is shown in FIG. 3A. By selecting the 'Manage Members' option block, the user may launch the management system 100.

At block 410, launching the manage members option, an option may be selected identifying whether a member is to be created at block 415 or modified/deleted at block 425. If a new member is to be created, the process proceeds to block 430. If a member is to be modified/deleted, the process proceeds to process 600.

At block 430, the user may be prompted via the interface 110 to have the option to create an administrator. If an administrator is to be created, the process proceeds to block 435. If a non-administrator member is to be created, the process proceeds to block 440.

At block 435 it is determined whether at least two transmitters are present within a predefined range of the control module 115. Two key fobs may be necessary to create a new administrator user profile. One key fob may belong to the current administrator while the second may belong to the new administrator. If both key fobs are detected, the process proceeds to block 445, if not, the process proceeds to block 450 where an error message may be presented via the user interface 110. For example, a detailed error message may be presented alerting the user to the fact that both key fobs are not located. The process may then end. Although not shown in process 400, in lieu of having two key fobs present, the owner may proceed with process 400 using a PIN issued upon purchase.

At block 445, an identification method may be selected. The identification method may be any one of the methods described above with respect to FIG. 3D. Additional identification methods may also be included. While the identification method may be selected by the user via the interface 110, the identification method may also be selected automatically by the control module 115. For example, if the authentication device 105 is a smart device associated with the new member, the control module 115 may communicate with the smart device automatically upon the smart device coming within a predefined range of the vehicle. Upon picking up a signal or detecting communications from the smart device, the control module 115 may automatically select the smart device as an identification method. Once an identification method has been selected, the process proceeds to establish a specific input via the selected identification method to include in the new member profile.

For exemplary purpose, two types of identification methods are shown in FIG. 4. A PIN identification method is shown at block 455 and a smart device identification is shown at block 460. Additional identification methods may be implemented, as described herein. In the example of a PIN identification method, once the method is selected, a PIN may be associated with the new member in the database 120. A PIN may be randomly generated by the processor or the control module 115. The randomly generated PIN may be displayed to the user via the interface 110. Alternatively, the PIN may be selected by the user for the new member, or if the new member is present during enrollment, the new member may select his or her PIN. For example, the user may use a number that he is familiar with to use as the PIN (e.g., a significant date). The chosen PIN may be received and sent from the user interface 110 to the control module 115 and stored in the database 120. The user may be prompted to verify the PIN a second, or even a third time. This may ensure that a typographical error did not occur during the initial input. Thus, a PIN may be used to identify a user in two different situations. First, a dealer given PIN may be used for creating members in lieu of two key fobs being present. Second, a PIN may be created to identify a secondary user.

In the example of a smart device being used as the identification method, as shown in block 460, the smart device may, as described above, be automatically detected by the control module 115. In this example, block 470 may be accomplished automatically by the control module 115 or processor. Alternatively, upon selection of a smart device as the identification method, the system 100 may identify the smart device via a wireless connection, as described above.

In block 480, it may be determined whether the default settings are to be accepted for the new member profile. The default settings may be stored in the database 120. Moreover, the default settings may vary whether the new member is identified as an administrator or not and whether the new member is to be classified as a primary or secondary member. For example, the default settings for an administrator may include fewer limitations on the vehicle use than that of a non-administrator member. One example would be that the speed limitation may not be enabled for an administrator while it may be for a non-administrator member. As discussed above, the default settings may be modified and even customized with each new member registration. Typically, a user may create his or her own profile and manage the user profile within the database. Users may also create other guest profiles. These guest profiles may include certain default settings. Certain limitations as to the default setting and customization of certain settings may be placed based on the type of user (e.g., administrator vs. non-administrator) creating the guest profile. For example, if a non-administrator member is creating the new member/guest profile, the non-administrator may not be permitted to adjust or modify the default settings. That is, a teenager cannot hand a car off to someone else and modify the default guest settings. On the other hand, if an administrator (e.g., parent) is created a guest profile, the default settings may be adjusted. Regardless, if the default settings are not accepted to be used for the new member profile, the process proceeds to block 490. If the default settings are accepted, the process proceeds to block 495.

At block 490, the user may create the features to be enabled with respect to the new user. Similar to FIG. 3F, an interface 110 may facilitate the selection and de-selection of certain features. Other features, such as the speed limitation, may also be selected and then customized to include a specific speed limitation (e.g., 70 mph). Personalized settings (e.g., climate control and seat position preferences) may also be customized at this time. The process proceeds to block 495.

At block 495, the new member profile is saved in the database 120. The profile, as explained above with respect to FIG. 2, may include the user identification and the features and limitations enabled with respect to that user. The new profile may also be saved in a local vehicle database.

The process then ends.

Figure 5:
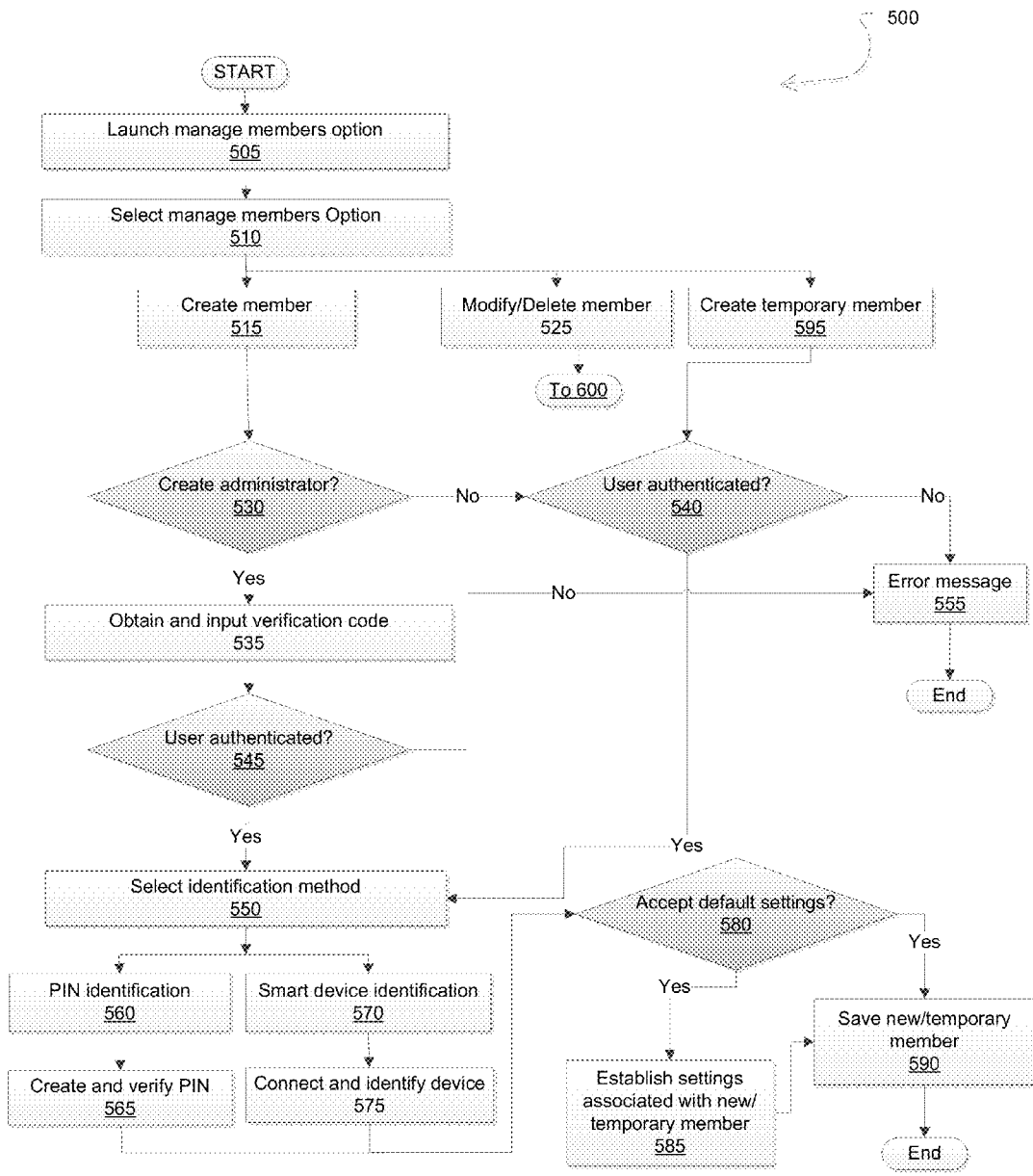
FIG. 5 illustrates another exemplary flowchart of an exemplary process for creating user profiles.

FIG. 5 shows an exemplary process 500 for creating, customizing and modifying user profiles when user key fobs may not be an identification method. FIG. 5 is similar to FIG. 4. Specifically, blocks 505-530 of the process 500 are similar to blocks 405-430 of process 400, respectively. At block 530, if a new administrator is being created, the process proceeds to block 535. If a non-administrator member is being created, the process proceeds to block 540.

At block 535, the user may receive an administrator identification such as an identification code which may be used to authenticate that user as an administrator. Unlike process 400, a key fob is not being used to identify the user. Thus, the administrator needs to be authenticated by some other mechanism. In the example of FIG. 5, a supplied identification code may be used to first authenticate and identify the administrator. The identification code may be one that is supplied by a dealership upon purchasing the vehicle. It may also be supplied by registering the new vehicle online. The identification code is assumed to be given to the true owner of the vehicle. Thus, whoever possesses the code is assumed to be an administrator. Further, the code may be provided so that the owner/administrator may enroll him or herself as an administrator member in the database 120. The code may also be used to enroll someone else, such as a secondary driver, other family member, etc. However, once an administrator has been registered, that administrator may further modify, add or delete other members.

If the identification code is correctly entered, meaning the vehicle control module 115 recognizes the identification code, the process may proceed to block 550. If the code is not validated, the process proceeds to block 555 where an error message may be displayed.

At block 560, the process proceeds as it does with respect to block 445. Blocks 565-590 proceeds similar to those described above with respect to blocks 450-495, respectively. Block 540 determines whether the user attempting to create a non-administrator user is authenticated. In other words, is the user authorized to create another user. Unlike the authentication above with respect to the identification code, it may be assumed that a non-administrator member may not create another administrator, and may only create other non-administrator members or temporary members. It should also be noted that a non-administrator member may not create a member having different settings than himself. Thus, a non-administrator member may not create another member with less cumbersome features applied (e.g., less speed limitations, etc.). This could result in the member creating a profile for a user with greater access and less safety constraints than he himself currently has.

In order to create another member, the non-administrator user may be authenticated via any of the described identification methods. As explained, a user may not add a profile to the database 120 for him or herself unless the user is an administrator authenticated at least by one of a key fob (as described with respect to the process 400), or by an identification code. If the user is authenticated, the process proceeds to block 550. If the user is not authenticated, the process proceeds to block 55, where an error message may be presented.

Additionally, at block 595, a temporary member may be created. As described above, a temporary member may be created and saved within the database 120, but may only be given access to the vehicle functions for a limited amount of time. Moreover, the defaults associated with a temporary member may differ from the defaults pre-assigned for administrator members and/or non-temporary or permanent members. A temporary member may be created by either an administrator member or a non-administrator member. Thus, as long as the user is authenticated at block 540, the temporary profile may be created.

Figure 6:
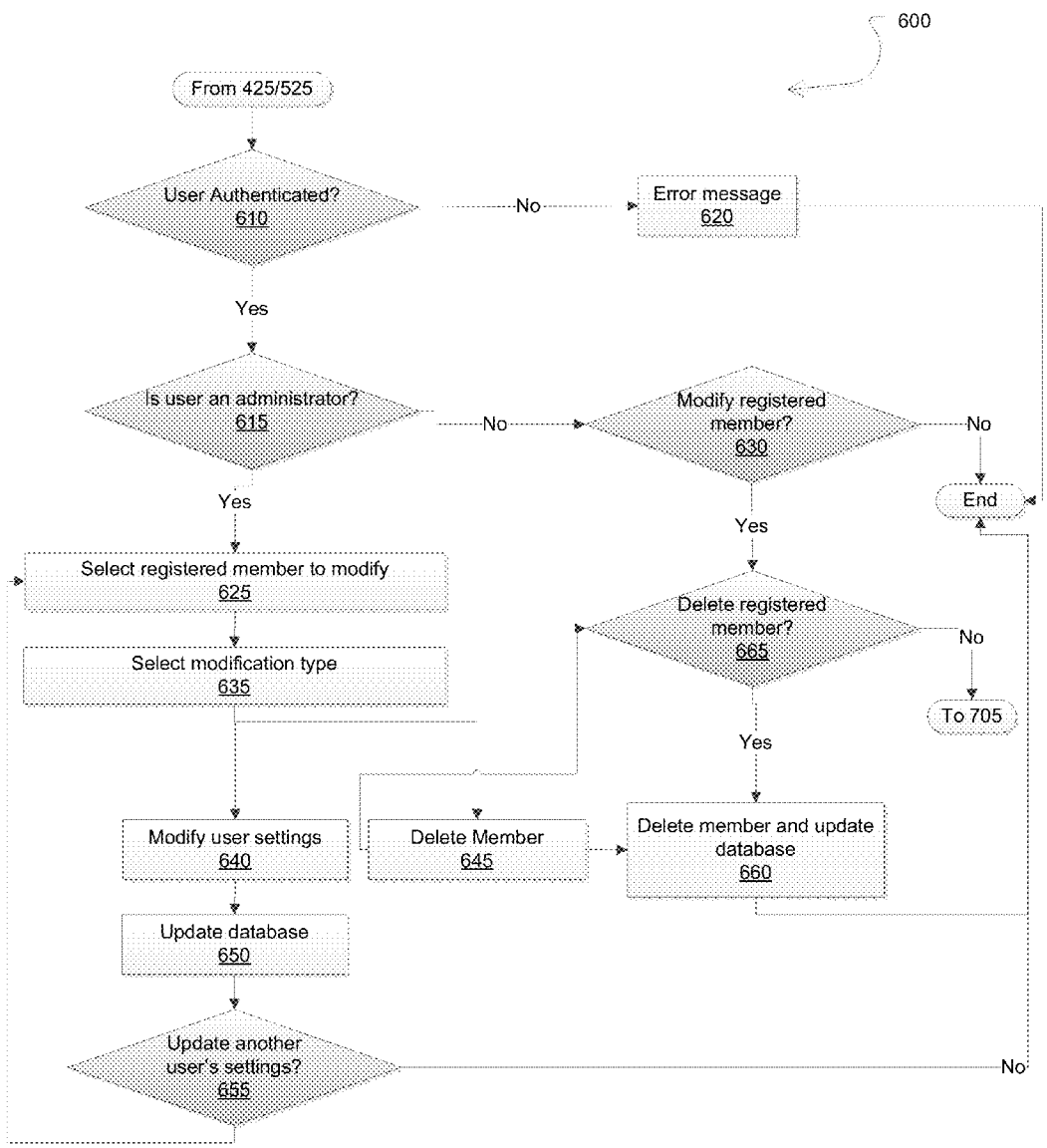
FIG. 6 illustrates an exemplary flowchart for an exemplary process for modifying and deleting existing member profiles.

FIG. 6 is an exemplary process 600 for modifying/deleting an existing member profile. The process 600 may proceed from block 425 in processes 400 and 525 in process 500.

Block 610 determines whether the user requesting the modification/deleting is an authorized member. If the user is authorized, the process proceeds to block 615. This may be determined by comparing the user input with the user identifications stored within the database 120. If a match is found, then the user may be considered an authorized member. If the user is not authorized, an error message may be presented in block 620. In block 615, is it determined whether the user is an administrator. This may be determined by identifying the profile associated with the matched user identifier and determining if the profile includes an indicator for an administrator (see FIG. 2). If the user is an administrator, as defined in the database 120, the process proceeds to block 625. If not, the process proceeds to block 630.

At block 625, if the user is an administrator the user may select the registered member profile he or she wishes to modify. This may include the profile associated with the user himself, or other registered members within the database 120. Note that a non-administrator user may not modify profiles of other users, only his own.

At block 635, the user selects the type of modification to perform. The user may modify an existing user profile at block 640, or may delete an existing profile at block 645. If the user modifies a profile, the process proceeds to block 650. Profile modification may be achieved via the user interface 110, similar to the creation of a member. For example, an interface 110, such as that shown in FIG. 3F, may provide a list of features available and allow the user to select, de-select, and customize the features. Once the desired modifications are made to the profile, the profile is updated and saved in the database 120 at block 650.

At block 655, the user may select to modify another profile. If so, the process proceeds to block 625. If not, the process proceeds may end.

If a member profile is to be deleted at block 645, the process proceeds to block 660 where the profile is deleted from the database 120. Additionally or alternatively, the profile may not be completely deleted but may be tagged as 'inactive'. Thus, while the profile is still saved, it will not allow access to the vehicle features if the user associated with the profile attempts access. Moreover, although not shown, the profile may become 'active' at a later time. This would allow the user to re-activate an existing profile and prevent the user from re-creating a profile for the specific user at a later time. This may be implemented, for example, when a child of the administrator has lost his or her driving privileges as a result of poor behavior. Thus, it may be easy and efficient for the administrator to grant and deny access to the child (non-administrator) depending on the current circumstances.

In another example, a member may be deleted by an OEM dealer via a service tool or super user PIN. These techniques may allow dealers to wipe the database 120 clean of registered users in order to transfer the vehicle to another user, e.g., sell the vehicle. These tools may only be available to the dealer and such super PINS may be securely kept by the dealers.

At block 665, the user, who is not an administrator, may decide whether to delete his or her profile. If the user decides to delete his profile, the process proceeds to block 645. If not, the process proceeds to block 705 where the user may modify his or her identification method.

Figure 7:
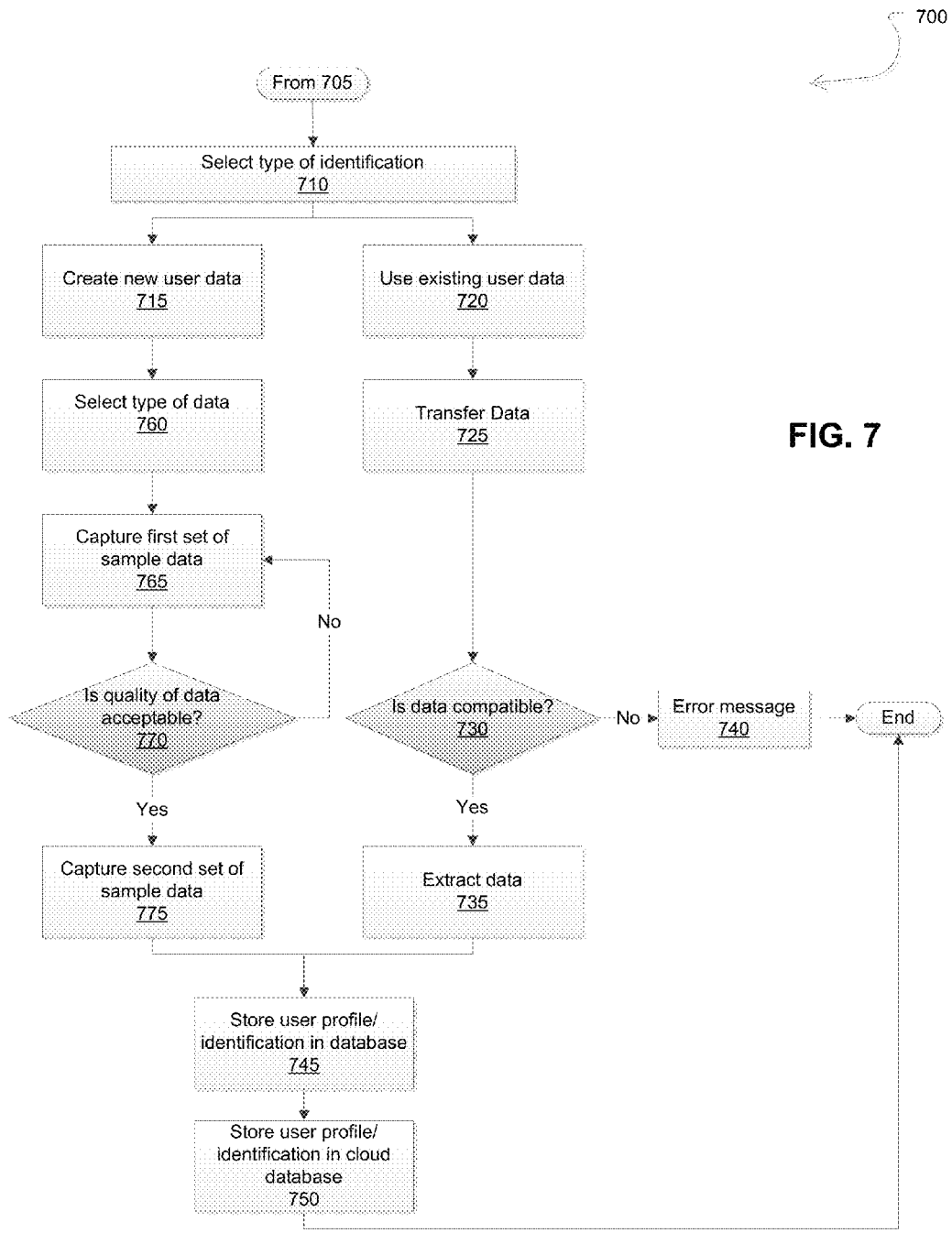
FIG. 7 illustrates an exemplary flowchart for adding an identification method to a member profile.

FIG. 7 is an exemplary process 700 for modifying one's own identification method. While a non-administrator user may not make changes to his own profile, he may make changes on how he is identified within the system 100. For example, if a child is currently authenticated based on a key fob, the child may wish to have a more convenient identification method, such as a biometric method. Thus, because the child is a registered member, the child may add an identification method to his or her profile. At block 710, the user may decide to how to add an additional identification method. The user may create a new identification method and thereby input new data into the authentication device 105 at block 715.

The user may also upload existing identification data at block 720. In this example, the user may already be registered within another database 120 of another vehicle. The user may save time by uploading this existing data rather than establishing new data within the current vehicle. For example, it may not be necessary for the user to establish a PIN or scan the user's fingerprint if the user has already done so with respect to a different system. This data may already be included in the uploaded data, thus saving the user time. Along with this, the user's member profile may also be included in the existing user data. At block 725, the data may be uploaded and transferred to the database 120, saving the respective features associated with the user as well as the identification methods. The profiles may be downloaded from at least one of a remote computer, smart device, universal serial bus (USB), SD card, etc.

At block 730, the control module 115 may determine whether the uploaded data is compatible. For example, the data may be downloaded as a file type that is not recognized by the control module 115. The data may be incomplete and thus not conducive for authentication. If the data is compatible, the process proceeds to block 735, if not, the process proceeds to an error message at block 740.

At block 735, the relevant data may be extracted. In uploading the data, additional data may be included that is not relevant or unnecessary for authentication purposes. For example, the data may include identification methods that are not available in all vehicles. The data may include biometric identification, but the current vehicle may not include a biometric sensor. Thus, the biometric data within the uploaded data need not be extracted. Further, additional features may be included and enabled in the uploaded user profile that may not be part of the system of the current vehicle. For example, the current vehicle may not include a speed limitation module and therefore the information within the user profile relating to the speed limitation function may not be extracted.

At block 745, the extracted data is stored in a database 120 within the vehicle. Additionally or alternatively, at block 750, the extracted data may be stored in the cloud database 120.

At block 760, if a user is creating new user identification data to be included within the user's respective profile, the user may select the type of data he or she wishes to add. For example, a user may add a biometric identification or a PIN.

At block 765, a first set of sample data is collected. This may mean, for example, that the user has scanned his or her fingerprint at a biometric scanner. In another example, the user may enter a new PIN.

At block 770, the control module 115 or processor may determine whether the data is acceptable. Taking the fingerprint example, the control module 115 may determine that a poor sample was taken in that not enough reference points could be detected in the scanned fingerprint to create an accurate biometric template. If the sample is not acceptable, the process returns to block 765. If the sample is acceptable, the process proceeds to block 775.

At block 775, a second set of sample data is collected. This data may be averaged with the first data to determine the new identification data. At block 745, this identification may be stored within the respective user profile in the vehicle database 120. At block 750, the identification may be stored in the database 120 within the cloud.

While the processes above are described with respect to a user interface 110 within a vehicle, this does not necessarily need to be the case. Users may be added, deleted and modified remotely, e.g., at a device not associated with the vehicle such as a personal computer, smart phone, tablet, etc. A server site may be configured for managing user profiles. This server site may function similarly to the user interface 110 described herein and present screen shots similar to the exemplary ones presented in FIGS. 3A-3F. The server site may be a website or mobile application configured to receive an authentication mechanism. Similar to the methods described above, once a user is authenticated, the user may modify, delete and add user profiles, depending on the user status (e.g., administrator member, non-administrator member, temporary member, etc.).

Figure 8:
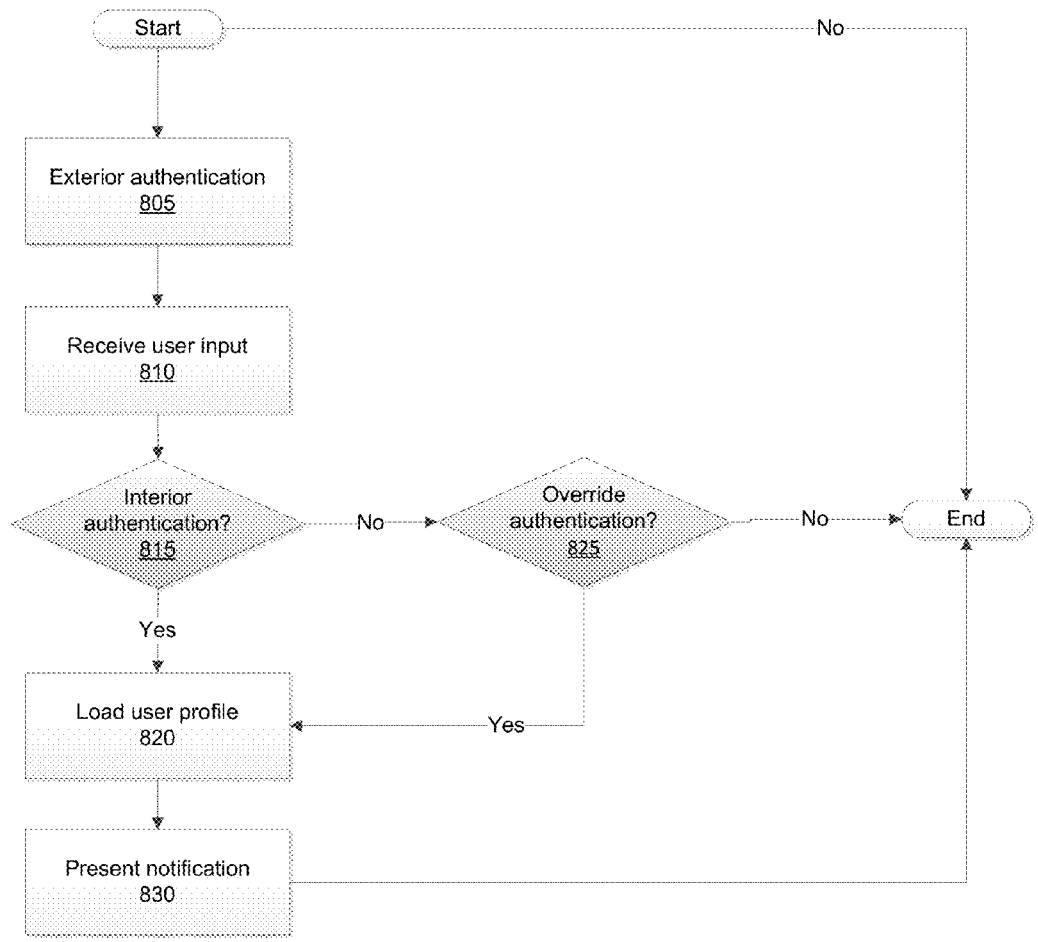
FIG. 8 illustrates an exemplary flowchart for authenticating a user and applying a member profile.

FIG. 8 is an exemplary process 800 for the authentication of a user via the management system 100. In general, process 800 describes a two tiered authentication process whereby a user may first gain access to the vehicle via a general input (e.g., via transmitter or key fob). A second form of authentication may then be based on a user input. Upon matching the user input with a saved user identification, the profile associated with the user identification is loaded, thereby enabling the selected features within the profile. The process 800 begins at block 805 where exterior access to the vehicle is granted. In other words, a user is able to enter the vehicle based on an authentication. The vehicle may be accessed upon receiving a general input. A general input may be an input that authorizes vehicle entry such as a signal produced by a transmitter or key fob. The general input may be one that is not specifically associated with a user such as a user specific PIN or biometric sample. In one example, a key fob is used to unlock the vehicle so that the user may enter the vehicle. In another example, a user may enter a general PIN using a door key pad. Once access to the vehicle has been granted, the process proceeds to block 810.

In block 810, the management system 100 receives a user input. The user input, as described above, may be any form of identification method such as a PIN, biometric input, etc. associated with the user. In block 815, the user input is used to determine whether the user is authenticated, e.g., a registered member within the database 120. The user input is compared, either at the control module 115 or at the processor, with the user identification data stored within the database 120. For example, if a user's fingerprint is scanned by a biometric device, the biometric input is converted to a biometric template and compared with the stored biometric templates within the database 120 to determine if the input matches one of the stored templates. As shown in FIG. 2 and discussed above, a user may have multiple identification methods within the respective user member profile. For example, a single user may be identified by any combination of his or her biometric data, a PIN unique to that user, a smart device, etc. The user may use any one of these methods for the user input to be used for authentication purposes. In one example, if the user is routinely failing authentication based on a biometric input, the use may attempt to be authenticated based on his or her smart device.

If a match is found in block 815, the process proceeds to block 820. If no match is found, the process proceeds to block 825.

At block 820, the user profile associated with the user identification that matched the user input is loaded. The profile may be transmitted from the database 120 to the control module 115 for processing. The profile, as explained above, may include a user identifier, category, enabled features, etc.

At block 830, a notification is presented to the user within the vehicle that he or she has been authenticated. Additionally or alternatively, the notification may inform the user of his or her category, e.g., as a primary or secondary member. A user's category may be determined by the user's profile that is loaded from the database 120. The notification may be presented via the user interface 110, as well as via an audible chime or message through the user interface 110 or vehicle speakers. Additionally or alternatively notification may come from the smart device via an SMS message. A vehicle's interior or exterior lights may also indicate that a user has been authenticated by varying their hues or blinking on in off in a certain pattern.

At block 825, if a user is not authenticated at block 815, the user may have the option to enter an override identification, such as a PIN. In the instance where a user is having difficulty authenticating himself, the user may override the identification method with a PIN input. In one example, a user scanning a fingerprint via a biometric scanner may continue to get an error message due to a poor biometric scan. The user may forgo the biometric input and insert a PIN instead. This PIN may be associated with the specific user, e.g., as a form of identification for that user. The PIN may be established by the administrator as described with respect to the processes in FIGS. 6 and 7. Additionally or alternatively, a single override PIN may be available. This override PIN may not be associated with any single user. Any user that wishes to operate the vehicle may use the PIN to gain access to vehicle functions. Thus, the user may not need to necessarily be a registered member, but only have access to the override PIN. Notably, a PIN is only exemplary and other identification and authentication methods may be used, such as a password.

If the user is authenticated using the override PIN, the process may then proceed to block 820. If not, the process may end. In block 825, as described above, a user profile may be loaded. Alternatively, if the override PIN was used, and no profile is associated with the user because the user is not a registered member, a default profile may be uploaded. The default profile may include a set of predefined features similar to those of a temporary member.

Thus, the system 100 may load a personalized profile based on the authentication of registered member. The system 100 may also load a default profile based on an override PIN. During operation, authentication of the user occurs quickly. In some situations, when a user enters a vehicle, the vehicle will automatically apply default settings, such as those of a secondary member. Once authentication occurs, the profile associated with the user would then be applied. Because the profiles are applied quickly, they may be applied without notice to the user, e.g., unobtrusively and transparently. In the event that a user is unregistered, some functionality within the vehicle may still be possible based on the certain default settings that were initially supplied.

Key fobs and similar transmitters may be transferred between drivers. Some key fobs may be used to identify a driver, and that identification may be used to apply a user profile at the control module 115. However, using key fobs as the only mechanism for identification may result in unintended features being applied. For example, a parent's key may be given to a teenage driver. The parent's key may be categorized as a primary key. However, the teenage driver should be categorized as a secondary driver. Thus, when a teenage driver uses a primary driver's key, the primary driver's profile and features are applied. If a secondary method of identification is used to authenticate the teenage driver, the secondary method may identify the driver as a secondary member and apply a more appropriate profile for the driver.

Figure 9:
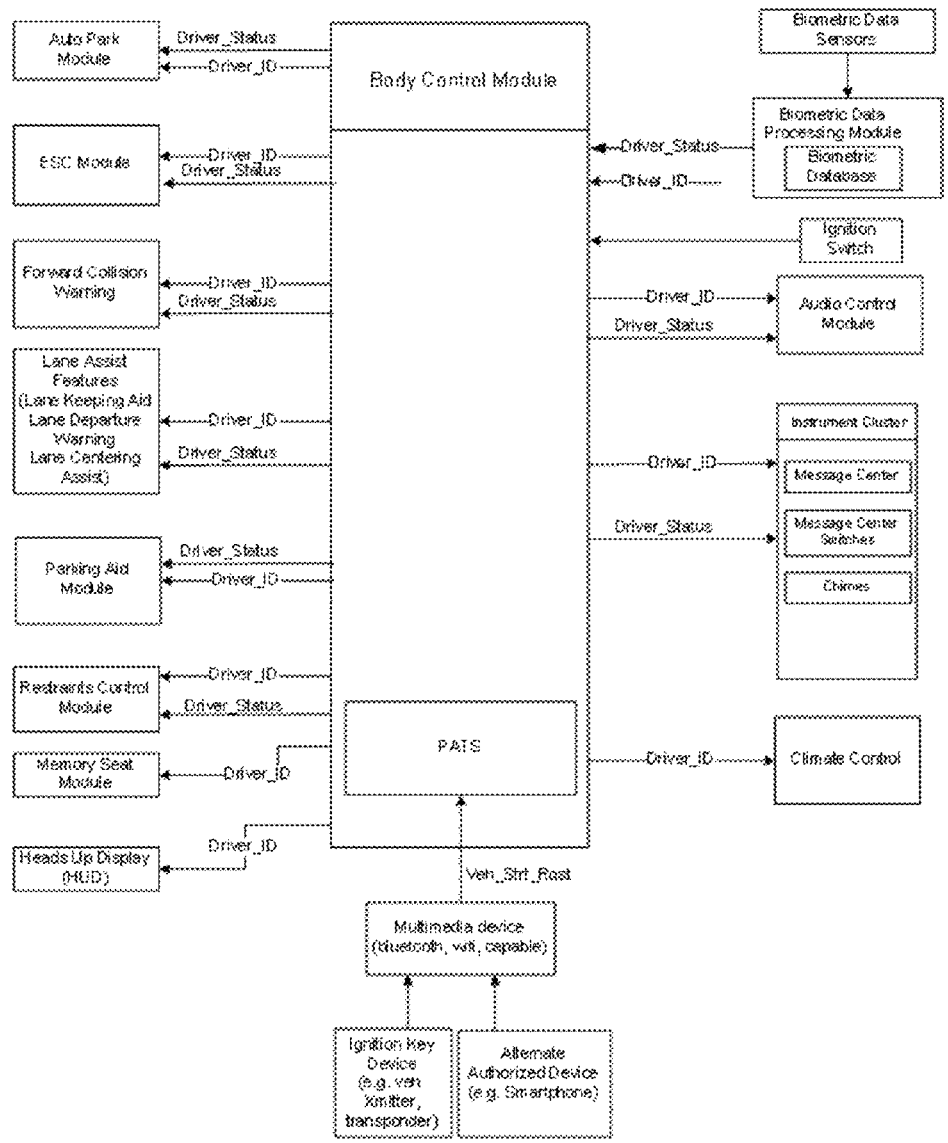
FIG. 9 illustrates an exemplary schematic view of the control module.

FIG. 9 an exemplary schematic of the control module 115 communicating with various feature modules and authentication devices 105. The control module 115, as described above, may facilitate communication between the authentication device, user interface 110 and database 120. It may also compare incoming user data with stored data from the database 120 to authenticate users. It may also communicate with each of the feature modules in view of the features selected within each user profile. In one example, if a speed limitation is set to 70 mph for one user, when that user is authenticated, the control module 115 may read the profile associated with that user and communicate the speed limitation to the ESC module for implementation.

In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices generally include computer-executable instructions where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores and databases described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A vehicle authentication-system, comprising:
   a vehicle display; and
   a computing device configured to:
      authenticate a first administrator via a first dealer administered identification;
      receive a create second administrator selection; receive a second identification distinct from the first identification; and
      create, via the vehicle display, a second administrator profile including the second identification and vehicle features associated with the second identification, wherein the features include allowing a second administrator to create other user profiles.

2. The system of claim 1, wherein the features are each associated with a feature module including at least one of a lane assist module, a collision alert module, a blind spot module, a restraint warning module, a speed limitation module and a park assist module.

3. The system of claim 1, wherein the authenticating a first administrator includes:
   a first authentication including recognizing a general input, and
   a second authentication including matching a received user input with first user identification.

4. The system of claim 3, wherein the general input includes a transmitter signal.

5. The system of claim 3, wherein the received user input is one of a password, personal identification number (PIN), biometric input and signal from a smart device.

6. The system of claim 3, wherein the received user input includes an override PIN.

7. The system of claim 6, wherein the computing device is further configured to apply a default profile in response to receiving the override PIN.

8. A method, comprising:
- authenticating, via a computing device, a first administrator via a first dealer administered identification;
- receiving, via an in-vehicle interface, a create second administrator selection; receiving a second identification distinct from the first identification;
- creating, at the interface, a second administrator profile including the second identification and a set of vehicle features associated with the second identification; and
- applying the set of features associated with the second identification in response to authenticating a user based on the second identification.

9. The method of claim 8, applying each feature within the set of features, wherein each feature is associated with a feature module.

10. The method of claim 8, wherein the authenticating a first administrator includes:
- a first authentication including recognizing a general input, and
- a second authentication including matching a received user input with the second identification.

11. The method of claim 10, wherein the general input includes a transmitter signal.

12. The method of claim 10, wherein the received user input is one of a password, personal identification number (PIN), biometric input and signal from a smart device.

13. The method of claim 10, wherein the received user input includes an override PIN.

14. The method of claim 13, further comprising applying a default profile in response to receiving the override PIN.

15. A non-transitory computer-readable medium tangibly embodying computer-executable instructions, comprising instructions for:
- authenticating an administrator via a dealer administered identification;
- receiving, via a vehicle display, a create new administrator selection;
- receiving a second identification distinct from the administered dealer identification; and
- creating, at the display, a second administrator profile including the second identification and a set of vehicle features, wherein the features include allowing a second administrator to create other user profiles.

16. The medium of claim 15, wherein each feature is associated with a feature module.

17. The medium of claim 15, wherein the authenticating a first administrator includes:
- a first authentication including recognizing a general input, and
- a second authentication including matching a received user input with the dealer identification.

18. The medium of claim 17, wherein the general input includes a transmitter signal.

19. The medium of claim 17, wherein the received user input is one of a password, personal identification number (PIN), biometric input and signal from a smart device.

20. The medium of claim 17, further comprising applying a default profile in response to receiving an override PIN.

\* \* \* \* \*